(12) United States Patent
Lau

(10) Patent No.: US 7,070,416 B1
(45) Date of Patent: Jul. 4, 2006

(54) ARM POSITIONING TRAINING TOOL

(76) Inventor: Allan Y. Lau, 707 10th Ave., San Francisco, CA (US) 94116

( * ) Notice: Subject to any disclaimer, the term of this patent is extended or adjusted under 35 U.S.C. 154(b) by 0 days.

(21) Appl. No.: 10/834,797

(22) Filed: Apr. 30, 2004

(51) Int. Cl.
G09B 9/00 (2006.01)
G09B 19/00 (2006.01)
A63B 69/00 (2006.01)

(52) U.S. Cl. ............ 434/250; 434/247; 473/212; 473/213

(58) Field of Classification Search ....... 434/250; 482/91, 98, 907; 473/212, 213; 70/15, 16, 70/24; 128/869, 878
See application file for complete search history.

(56) References Cited

U.S. PATENT DOCUMENTS

| | | | | |
|---|---|---|---|---|
| 647,735 A * | 4/1900 | Widmayer | ............. | 70/16 |
| 1,655,092 A * | 1/1928 | Brown | ............. | 473/212 |
| 2,754,121 A * | 7/1956 | Jacob | ............. | 434/250 |
| 3,884,464 A * | 5/1975 | Evangelos | ............. | 482/126 |
| 4,046,143 A * | 9/1977 | Bell | ............. | 128/882 |
| 4,257,591 A * | 3/1981 | Evans, Sr. | ............. | 482/91 |
| 4,406,453 A * | 9/1983 | Herzfeld | ............. | 482/126 |
| 4,896,887 A * | 1/1990 | Cable | ............. | 473/212 |
| 4,915,396 A | 4/1990 | Chaisson | | |
| 5,080,349 A * | 1/1992 | Vittone | ............. | 482/106 |
| 5,085,437 A * | 2/1992 | Leitao | ............. | 473/212 |
| 5,092,592 A * | 3/1992 | FitzMaurice | ............. | 473/464 |
| 5,203,567 A * | 4/1993 | Erlinger et al. | ............. | 473/276 |
| 5,344,323 A | 9/1994 | Burns | | |
| 5,403,256 A * | 4/1995 | Squires | ............. | 482/91 |
| 5,447,308 A | 9/1995 | Girard | | |
| 5,624,359 A * | 4/1997 | Dean | ............. | 482/91 |
| D390,615 S * | 2/1998 | Stutsman | ............. | D21/681 |
| 5,902,189 A * | 5/1999 | Schultz | ............. | 473/212 |
| 6,361,480 B1 * | 3/2002 | Coram | ............. | 482/83 |
| 6,652,420 B1 * | 11/2003 | Chen | ............. | 482/45 |
| 2004/0058757 A1 * | 3/2004 | Gray | | |
| 2004/0082445 A1 * | 4/2004 | Zabel | ............. | 482/109 |

OTHER PUBLICATIONS

John Derbyshire, "Shall We Dance", Oct. 26, 1998, National Review.*

* cited by examiner

Primary Examiner—Derris H. Banks
Assistant Examiner—Dmitry Suhol

(57) ABSTRACT

An arm positioning training tool includes an elongated rod that has a first end and a second end. The rod has a length generally between 36 inches and 44 inches. Each of a pair of rings has an inner edge perimeter edge and an outer perimeter edge. Each of the rings is attached to one of the first and second ends. The rod is attached to the outer perimeter edges of the rings so that the rings extend away from the rod. Each forearm of a pair of forearms of a person is removably positioned in one of the rings so that a proper distance between the forearms is maintained.

5 Claims, 2 Drawing Sheets

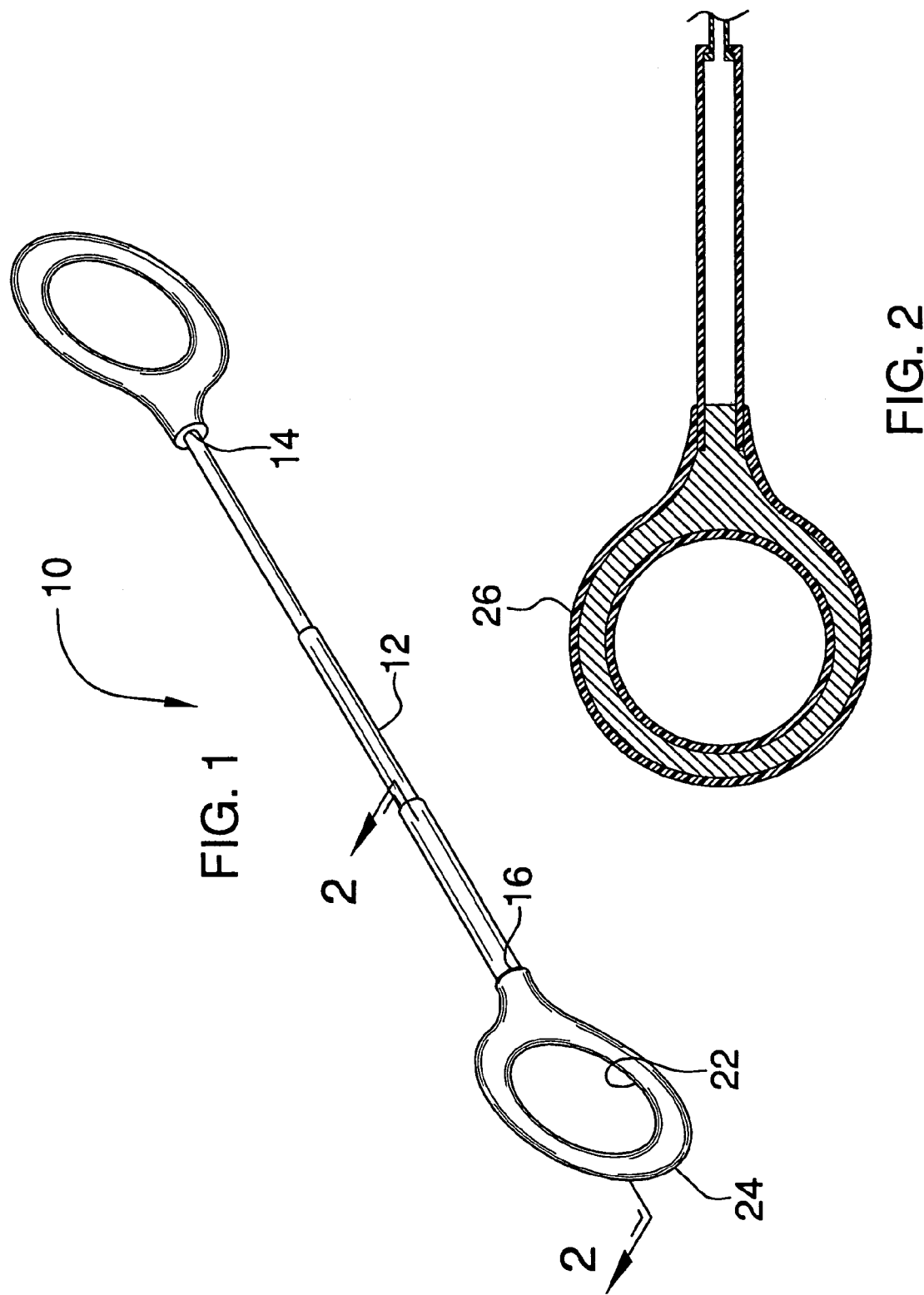

ARM POSITIONING TRAINING TOOL

BACKGROUND OF THE INVENTION

1. Field of the Invention

The present invention relates to dance teaching devices and more particularly pertains to a new dance teaching device for teaching proper arm spacing for dancing, and in particular for ballroom dancing.

2. Description of the Prior Art

The use of dance teaching devices, and more generally devices for training correct body movement is known in the prior art. U.S. Pat. No. 5,334,323 describes a device for positioning on the arms of a dancer and provides signals to the dancer when their arms move outside of a desired plane of motion.

While these types of devices fulfill their respective, particular objectives and requirements, the need remains for a device that prevents the movement of arms away from or toward each other while a person learns how to ballroom dance to ensure that the person learns the proper distance between arms that should be maintained.

SUMMARY OF THE INVENTION

The present invention meets the needs presented above by generally comprising an elongated rod that has a first end and a second end. The rod has a length generally between 36 inches and 44 inches. Each of a pair of rings has an inner edge perimeter edge and an outer perimeter edge. Each of the rings is attached to one of the first and second ends. The rod is attached to the outer perimeter edges of the rings so that the rings extend away from the rod. Each forearm of a pair of forearms of a person is removably positioned in one of the rings so that a proper distance between the forearms is maintained.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of an arm positioning training tool according to the present invention.

FIG. 2 is a cross-sectional view taken along line 2—2 of FIG. 1 of the present invention.

DESCRIPTION OF THE PREFERRED EMBODIMENT

Figure 3:
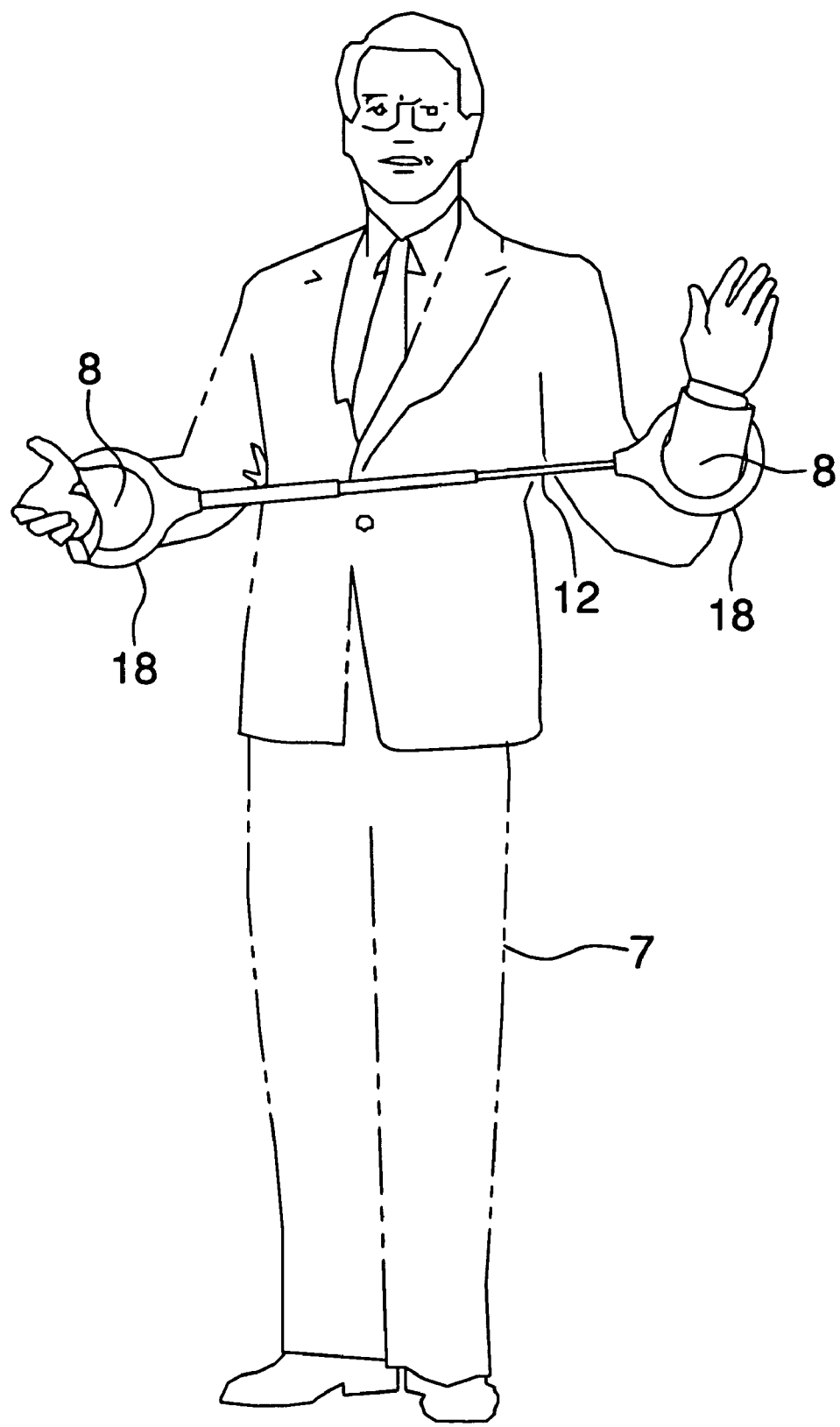
FIG. 3 is a front in-use view of the present invention.

With reference now to the drawings, and in particular to FIGS. 1 through 3 thereof, a new dance teaching device embodying the principles and concepts of the present invention and generally designated by the reference numeral 10 will be described.

As best illustrated in FIGS. 1 through 3, the arm positioning training tool 10 generally comprises an elongated rod 12 that has a first end 14 and a second end 16. The rod 12 is substantially hollow and comprised of a plastic material to keep the weight of the tool 10 low. The rod 12 is telescoping so that the rod 12 may be selectively extended or retracted. In particular, it is desired that the rod 12 can be retracted for storage purposes. The rod 12 has a length of between 36 inches and 44 inches when the rod is fully extended. However, smaller rods 12 may be constructed so that children may use the tool 10.

Each of a pair of rings 18 has an inner edge perimeter edge 22 and an outer perimeter edge 24. Each of the rings 18 is attached to one of the first 12 and second 16 ends. The rod 12 is attached to the outer perimeter edges 24 of the rings 18 such that the rings 18 extend away from the rod 12 as is shown in FIG. 1. The rings 18 are substantially coplanar with respect to each other. The rings 18 have an inner diameter generally between 4 inches and 6 inches. The rings 18 may be coated with a resiliently compressible material 26 to act as cushioning for a user of the tool 10. The compressible material 26 is preferably comprised of an elastomeric material.

In use, each forearm of a pair of forearms 8 of a person 7 is removably positioned in one of the rings 18. The user of the tool 10 then practices dancing, in particular ballroom dancing, while wearing the tool 10 in that fashion. The tool 10 prevents the forearms 8 from moving farther apart than permitted by rod 12 so that a proper distance between the forearms 8 is maintained. The wearer of the tool 10 trains their muscles to remember this position so that when the tool 10 is removed the user will know where their forearms 8 are to be positioned.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method training arm positioning for dancing, said method comprising the steps of:

providing an elongated rod having a first end and a second end, said rod having a length generally between 36 inches and 44 inches;

providing a pair of rings, each of said rings having an inner perimeter edge and an outer perimeter edge, each of said rings being attached to one of said first and second ends, said rod being attached to said outer perimeter edges of said rings such that said rings extend away from said rod, said inner and outer perimeter edges of said rings being substantially coplanar with respect to each other and with a longitudinal axis of said rod;

extending each forearm of a pair of forearms into one of said rings such that the forearms are retained in a proper distance from each other; and dancing with said rings positioned on said forearms.

2. The tool according to claim 1, wherein said rod is telescoping so that said rod may be selectively extended or retracted.

3. The method according to claim 1, wherein each of said rings has an inner diameter generally between 4 inches and 6 inches.

4. The method according to claim 1, wherein each of said rings is coated with a cushioning material.

5. The method according to claim 4, wherein each of said rings has a static shape.

* * * * *